United States Patent
Oram et al.

[19]

[11] Patent Number: 5,855,691
[45] Date of Patent: Jan. 5, 1999

[54] MERCURY RECOVERY PROCESS

[75] Inventors: Peter G. Oram, Halifax; John D. Currie, Pictou; Richard M. Kenno, Concord, all of Canada

[73] Assignee: Pioneer Licensing Inc., Ontario, Canada

[21] Appl. No.: 503,511

[22] Filed: Jul. 18, 1995

[30] Foreign Application Priority Data

Jan. 27, 1995 [GB] United Kingdom .................... 9501604

[51] Int. Cl.$^6$ ........................................................ B08B 7/04
[52] U.S. Cl. ........................................... 134/13; 134/25.1
[58] Field of Search ....................................... 134/13, 25.1

[56] References Cited

U.S. PATENT DOCUMENTS

| | | | |
|---|---|---|---|
| 1,483,371 | 2/1924 | Miller . | |
| 2,552,378 | 5/1951 | Haun et al. | 251/103 |
| 3,550,773 | 12/1970 | Villani et al. | 209/138 |
| 3,642,129 | 2/1972 | McDaniel et al. | 209/159 |
| 4,343,706 | 8/1982 | Etzel et al. | 210/667 |
| 4,554,066 | 11/1985 | Turbitt et al. | 209/3 |
| 4,789,464 | 12/1988 | Kuryluk | 209/161 |
| 4,913,807 | 4/1990 | Hendricks | 209/461 |
| 5,106,508 | 4/1992 | Schwitzgebel | 210/712 |
| 5,342,449 | 8/1994 | Holbein et al. | 134/2 |
| 5,372,650 | 12/1994 | Lahoda et al. | 134/25.1 |
| 5,516,968 | 5/1996 | Abel | 588/1 |

FOREIGN PATENT DOCUMENTS 0420380  4/1991  European Pat. Off. .

OTHER PUBLICATIONS

Mike Kuryluk, Nova Scotia Department of Environment Article, Nov. 1994.
The Nova Scotia Business Journal Article, Jan., 1994.

*Primary Examiner*—Zeinab El-Arini
*Attorney, Agent, or Firm*—Pillsbury Madison & Sutro, LLP

[57] ABSTRACT

A process for the recovery of heavy metals, and in particular, mercury from a heavy metal-contaminated soil, or the recovery of mercury from a mercury-contaminated material, wherein the particles containing the heavy metal or mercury are separated from soil or mercury-contaminated material by a hydraulic mineral separator. The process may additionally include pre-classification of the soil particles to form a sample having essentially constant soil particle size prior to separation in the mineral separator. The process provides a ready method for removal of mercury from mercury-contaminated materials or heavy metals from heavy metal contaminated soils which process can allow recovery of the mercury or heavy metal for re-use. Alternatively, the process provides a smaller volume of mercury- or heavy metal-contaminated soil or material to be treated.

12 Claims, 2 Drawing Sheets

MERCURY RECOVERY PROCESS

BACKGROUND OF THE INVENTION

1. Field of the Invention

This invention relates to a process for the recovery of mercury from a mercury-contaminated material, and in particular, to a mercury-contaminated soil. The invention also relates to a process for the remediation of said soils by the removal of mercury from all or a portion of these soils.

2. Description of the Related Art

Liquid mercury is used in a variety of industrial process including its use as an electrode in some chlor-alkali plants for the production of chlorine and caustic. The use of such mercury cells for this application is well known in the industry.

Occasionally, during operation of this type of chlor-alkali plant, some mercury may be lost to the environment where it contaminates the soil in the immediate vicinity of the cell. This contaminated soil is generally disposed of by, for example, sending the soil to a suitable landfill operation which is set up to handle this type of waste material. However, since the actual amount of mercury loss to the environment is relatively small, and the amount of soil which must be land-filled is generally large, the cost of such a land-filling operation can amount to a significant expense.

In the mining industry, it is known that soil particles containing precious metals, such as gold, can be separated from other particles of comminuted ores, by use of a hydraulic mineral separator. This type of device uses a upward flow of a liquid, which is preferably water, through an essentially vertical tube, to separate those particles having a higher density from those particles with a low density. Generally, the liquid stream enters the vertical tube at or near the bottom of the tube and flows upwardly until it exits the tube at or near the top of the tube. Soil particles of an essentially constant size (by volume) are fed into the top of the tube. The rate of liquid flow is controlled so that only the heavier particles will settle and/or sink through the upwardly flowing liquid stream. The lighter particles are unable to sink through the upwardly flowing liquid stream and remain at, or near the top of the vertical tube.

These types of hydraulic mineral separators have been know for a number of years and have been described by, for example Miller in U.S. Pat. No. 1,483,371 (issued Feb. 12, 1924), McDaniel et al. in U.S. Pat. No. 3,642,129 (issued Feb. 15, 1972), Turbitt et al. in U.S. Pat. No. 4,554,066 (issued Nov. 19, 1985), and Kuryluk in U.S. Pat. No. 4,789,464 (issued Dec. 6, 1988). While these types of devices have been known for several years, their primary use has been limited to the classification of ore samples for mining operations as a guide to the amount of heavy metals present in an ore sample. To date, it has been unknown to use an hydraulic mineral separator for the purpose of recovering mercury from a mercury-contaminated material, or for recovering mercury or other heavy metals (or concentrating into a smaller soil sample) from heavy metal-contaminated soils.

SUMMARY OF THE INVENTION

Accordingly, the present invention provides a heavy metal waste recovery process which process comprises i) classification of said heavy metal contaminated soil to form a soil sample having soil particles of substantially the same particle size, ii) treatment of said soil particles in a hydraulic mineral separator to form a higher density, heavy metal-containing fraction and a lower density, substantially heavy metal-free fraction, and iii) separation of said higher density fraction from said lower density fraction.

Preferably, the heavy metal of most interest in the practise of the present invention is mercury, and the remaining discussion will be directed at a process for recovery of mercury. However, any other heavy metal, such as lead, might also be recovered or removed from a contaminated soil sample through the process of the present invention.

Further, the present invention also provides a process for recovery of mercury from a mercury-contaminated materials comprising i) treatment of said mercury-contaminated material in a hydraulic mineral separator to form a higher density, mercury-containing fraction and a lower density, substantially mercury-free fraction, and ii) separation of said higher density fraction from said lower density fraction.

In operation of the hydraulic mineral separator, the particles containing the heavy metal or mercury will settle/sink through the vertical tube of the separator because of the high specific gravity of the heavy metal or mercury. These particles can be collected at the bottom of the tube.

DESCRIPTION OF THE PREFERRED EMBODIMENT(S)

Figure 1:
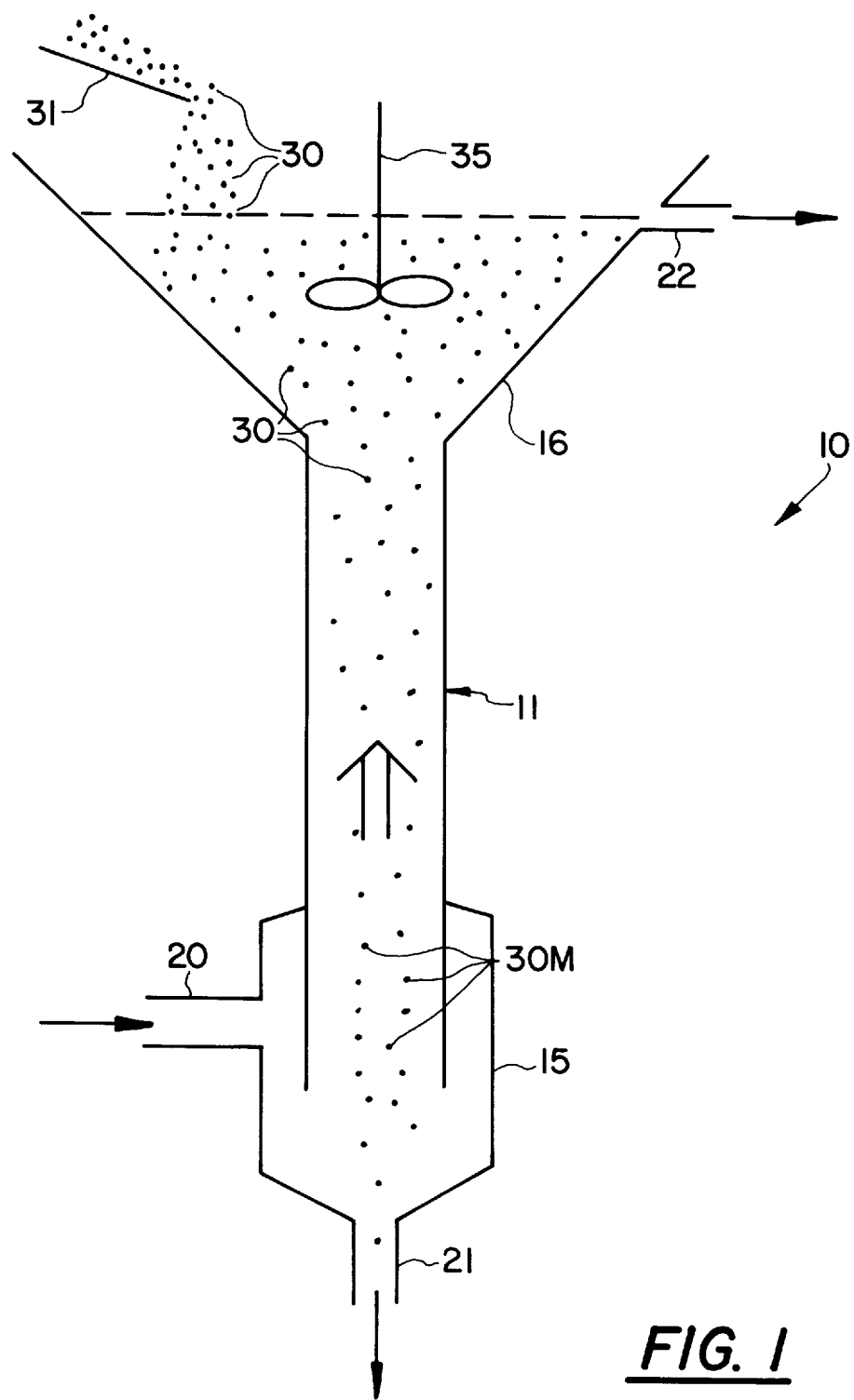
FIG. 1 describes a process diagram for the operation of a hydraulic mineral separator in accordance with the process of the present invention.

In a preferred embodiment of the present invention, the process of the present invention is utilized to remove mercury from a mercury contaminated soil. This process may be used to concentrate the mercury into a smaller volume, soil sample, however, preferably, the liquid mercury separates from the soil sample in order to form a relatively heavy, dense mercury droplet. This heavy, dense droplet of mercury will settle through the separator, and thus, the hydraulic mineral separator will effectively remove the mercury from the soil sample. Accordingly, in a preferred embodiment, the process of the present invention provides a method for the removal of mercury from a mercury-contaminated soil sample.

The remaining soil particles, which do not contain mercury, or from which the mercury has been removed, are not sufficiently heavy to sink through the liquid flow and thus will collect at the top of the tube.

Depending on the efficiency of the hydraulic mineral separator the resultant "high density particles" found in the high density portion, may consist essentially of mercury with some trace amount of soil contamination. This mercury may be collected and reused as liquid mercury after additional purification (if desired). The high density particles may also be collected as a smaller volume soil sample which contains higher levels of mercury than the initial, larger volume soil sample. Treatment and/or disposal of the smaller soil sample is preferable to treatment and/or disposal of the larger volume soil sample since the cost of disposal of this concentrated sample in, for example, an approved land-filling operation, would be reduced over the cost of land-filling the larger initial volumes of contaminated soil.

The remaining soil particles are separated from the mercury (or other heavy metal) contamination and thus, are essentially free from contamination. These soil particles may be returned to the original site as part of a soil remediation program.

Because of the high specific gravity of the liquid mercury, essentially all of the mercury will be removed with the soil of higher density. However, the efficiency of the process in separating mercury from the total soil sample is dependent on the process conditions utilized. It is preferred, however, that the process conditions be set so that the "high density particles" consist of greater than 90% mercury, and that the mercury collected as "high density particles" accounts for greater than 90% of the mercury originally present in the soil sample. More preferably, both of these levels are greater than 95%, and most preferably, both of these levels are greater than 99%.

In one aspect of the process of the present invention, the soil sample is classified by particle size. This classification stage can be any of a number of soil treatment processes and can involve process such as crushing and screening, and the like. Generally, the purpose of this process stage is merely to provide particles which have a given particle size by volume. This first classification stage may be merely a screening of the soil in order to form a number of different soil samples wherein the particle size within each sample is essentially constant. Each soil sample can then be sent through the hydraulic mineral separator with the process conditions of the separator being set for each individual soil particle size.

Preferably, the classified soil particle sample will have a soil particle distribution such that greater than 90% of the soil particles will have a particle size which is between 50 and 150% of the median particle size. More preferably, the soil particles in the soil sample such that greater than 95% of the soil particles will have a particle size which is between 75 and 125% of the median particle size. A preferred soil sample size would be in the range of 0.1 to 1 cm, and more preferably, in the range of 0.1 to 0.6 cm, and most preferably between 0.2 and 0.4 cm. However, any suitable soil particle size may be acceptable provided that the process parameters of the hydraulic mineral separator can be adjusted to treat the soil size selected.

The hydraulic mineral separator can be any of the hydraulic mineral separators known in the mining industry, which can be used to separate materials having a high specific density from those having a low specific density by using a flowing liquid stream. A preferred mineral separator, however, is one which has been designed to operate in a continuous manner so that the contaminated soil can be added continuously to the process, and the mercury and the soil discharge can be removed on a substantially continuous basis.

A wide variety of liquids may be used in a hydraulic separator. It is desirable to use liquids which do not react with the heavy metals, soils, mercury-contaminated materials, or the mercury, other than to dissolve the soil particles. The density of the liquid selected should also be such to facilitate the settling of the high density particles through the liquid. A most preferred liquid for use in the present invention is water.

The preferred method of operation of the process of the present invention is an embodiment wherein the mercury is collected as an essentially pure mercury stream. This process allows the collection of a mercury stream which can be recycled and/or re-used, and allows for the remediation of the contaminated soil so that it can be released to the environment without taking any further treatment stages.

However, the process may be operated in a fashion so that the mercury or a non-liquid heavy metal is concentrated into a smaller soil sample volume. The effect of this type of process is that most of the heavy metal, and preferably, at least 90%, and more preferably, at least 95% of the heavy metal, by weight, which is originally present in the initial soil sample, is concentrated into a relatively small amount of soil, and preferably, less than 10%, and more preferably, less than 5% of the original soil sample amount, by volume. This concentrated volume of contaminated soil can then be further treated to remove the heavy metal contamination, or can be sent to a disposal means, such as for example, a landfill operation. However, by reducing the volume of soil to be land-filled, considerable savings in landfill cost can be realized.

In the process of the present invention, it is possible that an unacceptably high amount (depending on various discharge standards) of mercury, or heavy metal, may become dissolved in, or dispersed in (as fine droplets) the liquid used in the mineral separator. When this occurs, the heavy metal is lost as part of the mineral separator overflow and thus it is necessary to treat the liquid (e.g. water) in order to remove the heavy metal (e.g. mercury) from the water stream.

Accordingly, the present invention also provides a process wherein the liquid being discharged from the mineral separator is treated in a liquid treatment process to remove the heavy metal contaminants, and in the preferred embodiment, to remove mercury from the water used in the mineral separator. Thus, in a preferred water treatment process, the water from the mineral separator which contains the high density particles is directed to a sedimentation tank wherein the high density particles settle from the water, and are removed. This water after settling is essentially free of mercury and can be discharged or recycled to the process system.

The liquid overflow from the mineral separator (which contains the lower density particles) is also directed to a second sedimentation vessel wherein the solid particles settle to the bottom of the vessel and are removed. Chemicals, such as aluminum sulphate or other conventionally known water treatment coagulants, may optionally be added in order to shorten the sedimentation time, and/or to increase sedimentation efficiency. The supernatant from the sedimentation vessel may be recycled, in whole or in part, to the process, or may be further treated in order to be discharged from the system. A preferred further treatment process involves further sedimentation in additional sedimentation vessels. After the suspended particles have settled and been removed, the final supernatant is treated with acid or caustic as necessary to adjust the pH of the liquid to between 7 and 11, and more preferably between 7.5 and 8.5 and, most preferably to a pH of about 8. The pH adjusted liquid is then treated with various chemicals, such as ferrous sulphate or sodium hydrosulphide to remove any remaining heavy metals (or mercury) as newly created suspended solids or sulphides in a stirred settler. The overflow from the settler can then be filtered through, for example, a sand filter followed by a carbon filter to remove any carbon adsorbent liquids or solids. The carbon filtered water may then be discharged to the environment.

EXAMPLES

The process will now be described, by way of example only, by reference to the following example, and by reference to the attached figures wherein FIG. 1 describes a process diagram for the operation of a hydraulic mineral separator in accordance with the process of the present invention; and FIG. 2 describes a process flow sheet for the operation of a preferred process of the present invention.

In the FIG. 1 hydraulic mineral separator 10 comprises an upright central tube 11 which extends from a water inlet chamber 15 to funnel opening 16. Water inlet 20 is attached to water inlet chamber 15, and discharge outlets 21 and 22 are attached to water inlet chamber 15 and funnel opening 16, respectively.

In the practise of the present invention, water is fed to separator 10 through water inlet 20. The water enters water inlet chamber 15 and then flows upward through central tube 11 into funnel opening 16. A portion of the water exits separator 10 through discharge opening 21, and the remaining water exits separator 10 through discharge opening 22. Discharge opening 21 is smaller than water inlet 20 so as to ensure that water is forced to flow upward through tube 11. The flow of water into separator 10 is controlled so that the flow of water upward through tube 11 is essentially constant.

Mercury-contaminated soil paricles 30, having an essentially constant particle size by volume are added from hopper 31 to funnel opening 16. There, they are mixed into the water in funnel 16 by stirrer 35. While in funnel opening 16, soil particles 30 enter the upper opening of tube 11. Only those particles which contain mercury, or which consist essentially of mercury which has been released from soil particles 30 have a density which allows the particles to settle through the upwardly flowing water stream in tube 11. These dense soil particles (or mercury droplets), designated as 30M are able to settle through tube 11 and fall into water inlet chamber 15.

Water inlet chamber 15 has a cross sectional area greater than that of tube 11 so that the water velocity in chamber 15 is less than in tube 11. Accordingly, once particles 30M have reached chamber 15, they quickly settle to the bottom of chamber 15, and are removed through discharge opening 21. The mercury droplets or denser soil particles 30M can be separated from the water stream exiting discharge opening 21, and the water returned to the system through inlet 20.

Soil particles 30 which are not sufficiently dense to settle through tube 11 are eventually discharged from discharge opening 22. The particles may be separated from the water, and the water recycled to the system through inlet 20.

Stirrer 35 is optional particularly if funnel opening 16 is designed so as to promote mixing of soil particles 30 in the water from tube 11. This mixing minimizes the chances of mercury-contaminated soil prematurely exiting separator 10 through discharge opening 22.

In one embodiment of the present invention, a process as claimed in the present invention, and as described hereinabove, was utilized to remove mercury from a soil sample of 1500 tonne of a soil/clay mixture. This mixture was pre-screened to provide a coarse mixture having a soil particle size of less than 0.6 cm, and a medium mixture having a soil particle size of less than 0.3 cm.

The soil/clay mixtures were treated at a rate of about 5 tonne per hour, in a hydraulic mineral separator which was being fed with water at a rate of 15 gallons (68 litres) per minute (about 4 tonne per hour). Over 99.9% of the mercury analytically determined to be present in the soil/clay mixture, was recovered.

Figure 2:
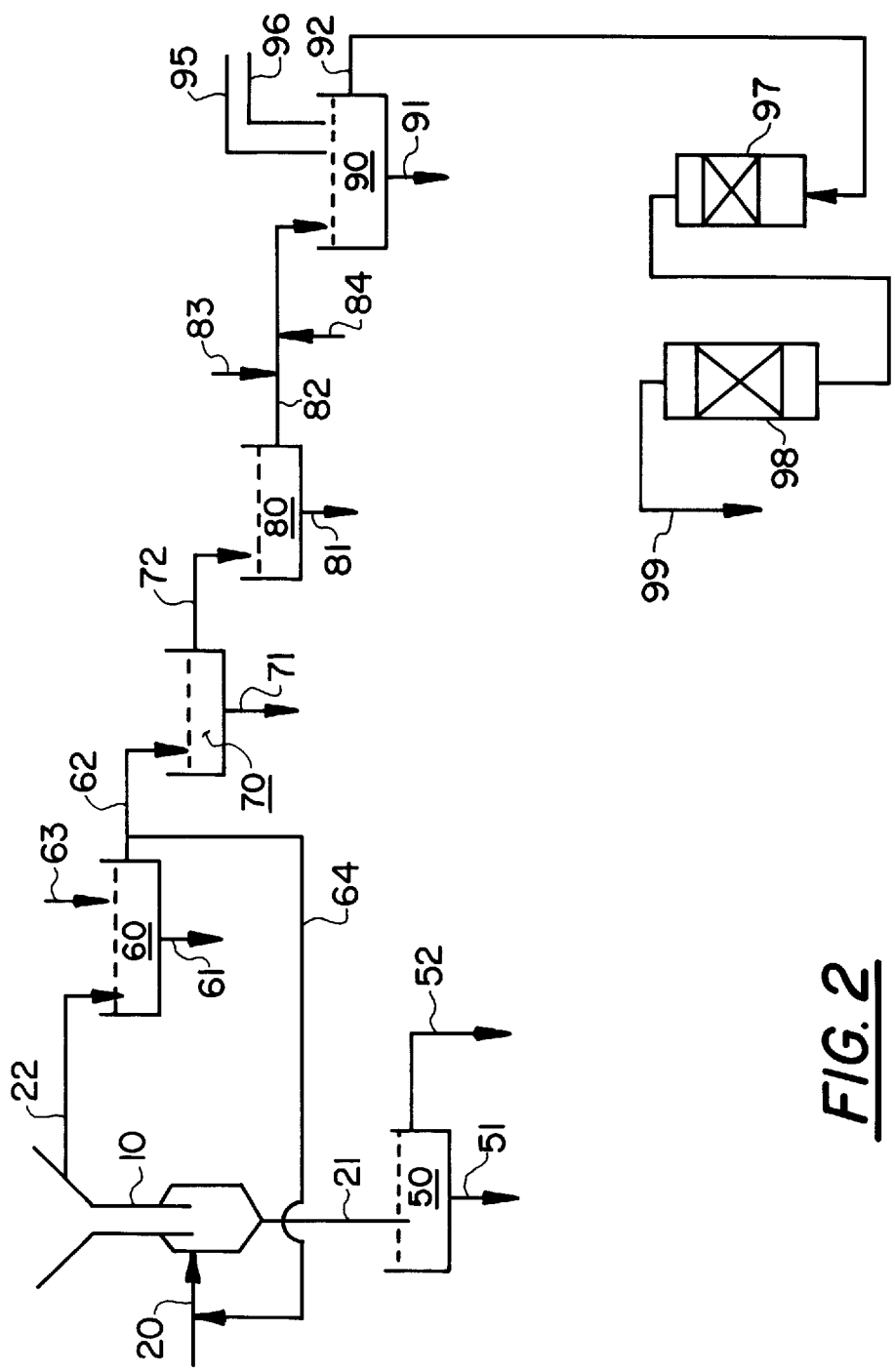
FIG. 2 describes a process flow sheet for the operation of a preferred process of the present invention.

In FIG. 2, a process flow sheet is shown wherein the water discharge from mineral separator 10 is shown. The water exiting mineral separator 10 through discharge outlet 21 is directed to sedimentation vessel 50. Settled "solids" consisting of the liquid mercury are removed through discharge outlet 51 while the water supernatant is removed through outlet 52.

The water exiting mineral separator 10 through discharge outlet 22 is directed, in series, to settlementation vessels 60, 70, and 80. At each vessel, settled solids are removed, respectively, from discharge outlets 61, 71 and 81. The supernatant from each vessel is removed respectively, through outlets 62, 72, and 82. In order to improve the sedimentation rate, aluminum sulphate is added as a coagulant through pipe 63. A portion of the supernatant removed from vessel 60 is recycled through pipe 64 to mineral separator water inlet 20 where it is mixed with water entering mineral separator 10.

The supernatant exiting vessel 80 is treated with sulphuric acid added through line 83 or caustic soda added through line 84 to a pH of between 7.5 and 8.5. The pH adjusted liquid is added to a settler 90. Ferrous sulphate and sodium hydrosulphide are added to settler 90 through inlet lines 95 and 96 respectively in order to create additional mercury-containing solid salts which settle to the bottom of settler 90. The settled solid salts are removed through outlet 91, and the supernatant is removed through outlet 92. The supernatant is then passed, in series through sand filter 97 and carbon filter 98. The water exiting carbon filter 98 is then discharged to the environment through outlet 99.

Having described specific embodiments of the present invention, it will be understood that modifications thereof may be suggested to those skilled in the art, and it is intended to cover all such modifications as fall within the scope of the appended claims.

The embodiments of the invention in which an exclusive property or privilege is claimed are defined as follows:

1. A heavy metal waste recovery process which process comprises i) classification of a heavy metal contaminated soil to form a soil sample having soil particles of substantially the same particle size, ii) treatment of said soil particles in a hydraulic mineral separator with a liquid which does not react with the heavy metal to form a higher density, heavy metal-containing fraction and a lower density, substantially heavy metal-free fraction, and iii) separation of said higher density fraction from said lower density fraction.

2. A process as claimed in claim 1 wherein said heavy metal is mercury.

3. A process as claimed in claim 1 wherein said higher density fraction is comprised of droplets of liquid mercury.

4. A process as claimed in claim 3 wherein said droplets of liquid mercury consist of greater than 90% mercury, and wherein droplets of liquid mercury collected accounts for greater than 90% of the mercury originally present in the soil sample or the mercury-contaminated material.

5. A process as claimed in claim 4 wherein said droplets of liquid mercury consist of greater than 95% mercury, and account for greater than 95% of the mercury originally present in the soil sample or the mercury-contaminated material.

6. A process as claimed in claim 1 wherein the soil particles of said soil sample have a soil particle size distribution such that greater than 90% of the soil particles will have a particle size which is between 50 and 150% of the median soil particle size.

7. A process as claimed in claim 1 wherein said heavy metal contaminated soil is added continuously to said hydraulic mineral separator.

8. A process as claimed in claim 1 wherein greater than 90% of the heavy metal present in said heavy metal contaminated soil is collected in a soil sample which has a sample volume of less than 10% of the soil sample.

9. A process as claimed in claim 1 wherein the liquid used in said hydraulic mineral separator is water.

10. A process as claimed in claim 9 additionally comprising a water treatment process to remove heavy metals from the water used in said hydraulic mineral separator.

11. A process as claimed in claim 10 wherein said heavy metal is mercury, and said water treatment process comprises:
  i) treatment of the water removed from said hydraulic mineral separator with said higher density, mercury-containing fraction in a sedimentation vessel so as to seperate said mercury from said water; and
  ii) treatment of the water removed from said hydraulic mineral separator with said lower density, substantially mercury-free fraction in one, or in series through a plurality of sedimentation vessels, with or without addition of a coagulant to at least one of said sedimentation vessels; adjustment of the pH of the water from said sedimentation vessels to a pH of between 7.5 and 8.5 and subsequently treating said water in an additional sedimentation vessel with ferrous sulphate and/or sodium hydrosulphide to produce solid mercury-containing salts, and settling of said salts in said additional sedimentation vessel; and filtering, in series, the water from said additional sedimentation vessel through a sand filter and a carbon filter.

12. A process for recovery of mercury from a mercury-contaminated material comprising I) treatment of said mercury-contaminated material in a hydraulic mineral separator with a liquid which does not react with mercury to form a higher density, mercury-containing fraction and a lower density, substantially mercury-free fraction, and ii) separation of said higher density fraction from said lower density fraction.

* * * * *